Figure 1:
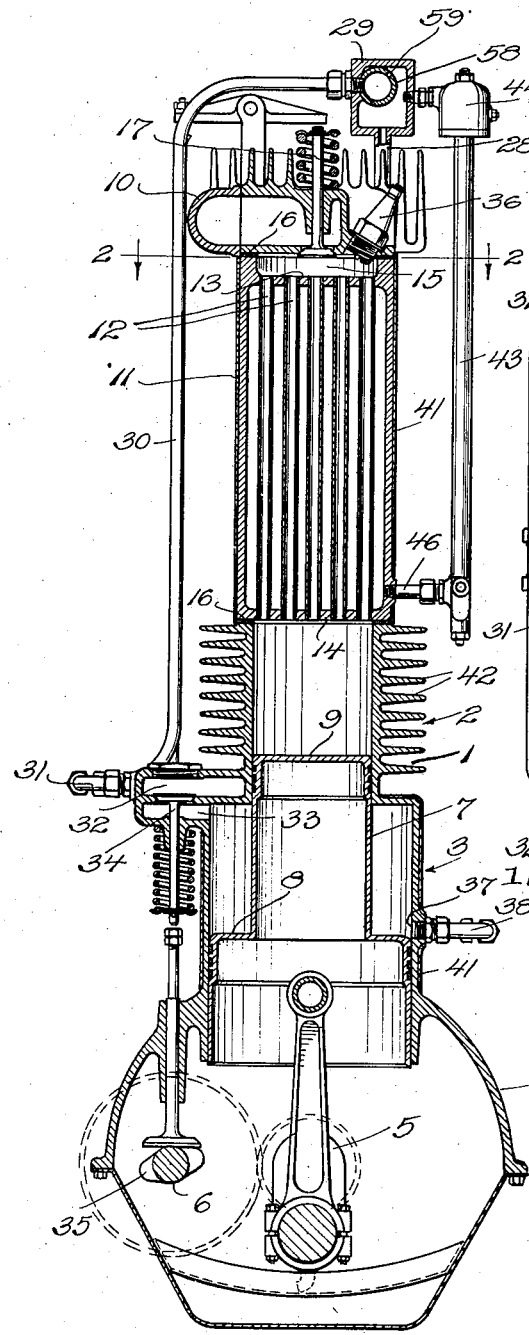

March 27, 1934.   R. F. GATCH   1,952,495
ENGINE
Original Filed April 23, 1930   3 Sheets-Sheet 1

Inventor
R. F. Gatch
By N. D. McDowell
Attorney

March 27, 1934.    R. F. GATCH    1,952,495
ENGINE
Original Filed April 23, 1930    3 Sheets-Sheet 2
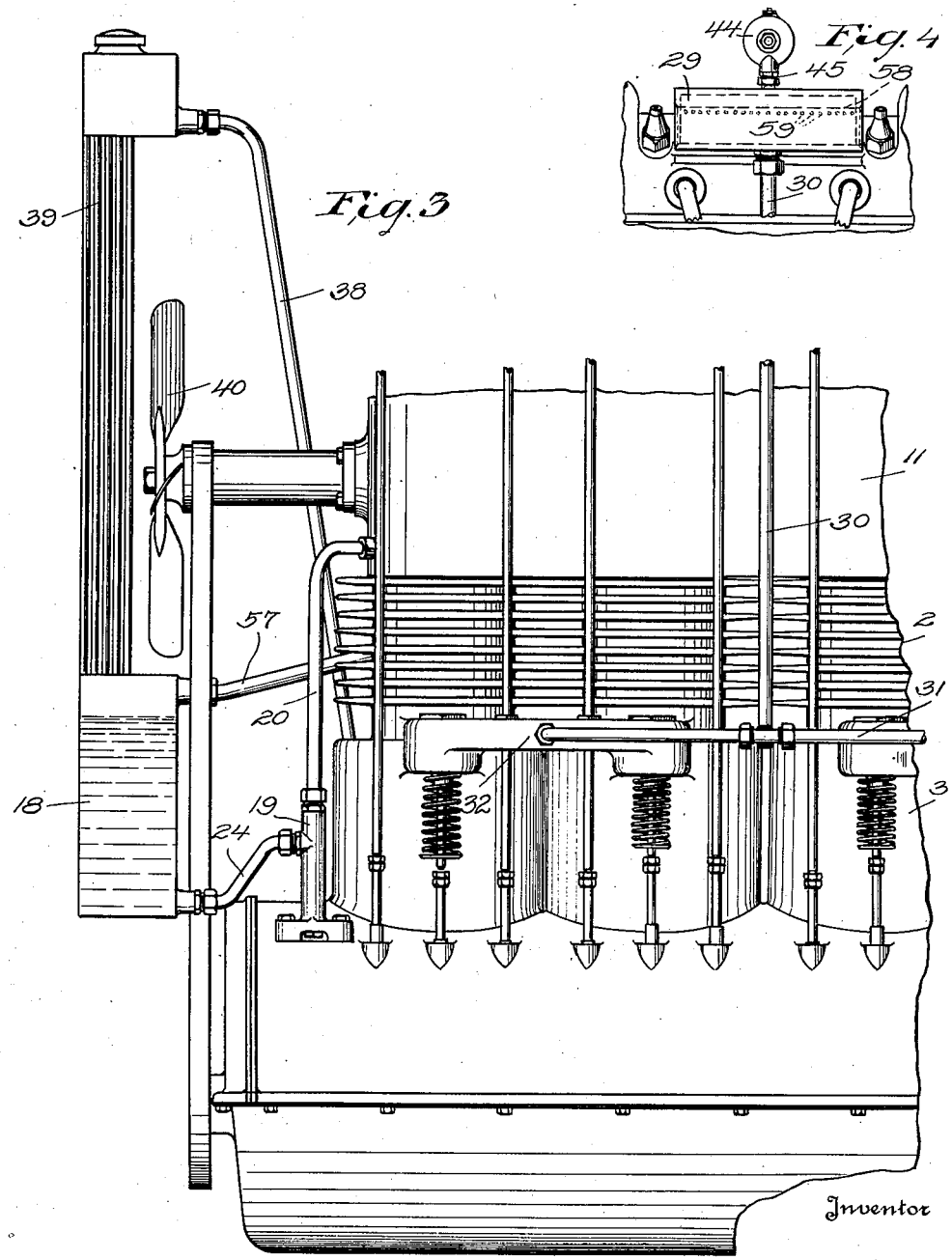

March 27, 1934. R. F. GATCH 1,952,495
ENGINE
Original Filed April 23, 1930 3 Sheets-Sheet 3
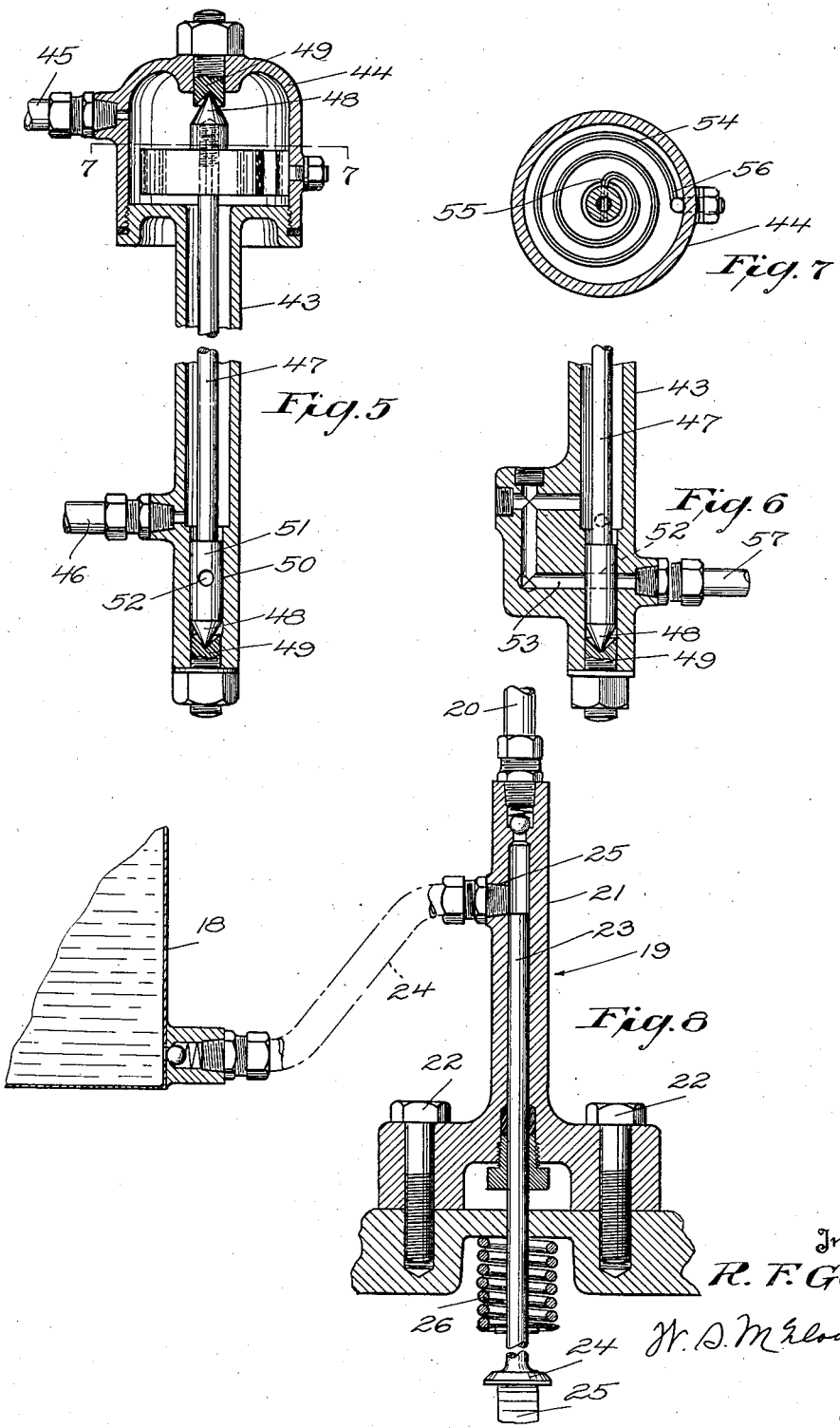

Patented Mar. 27, 1934

1,952,495

UNITED STATES PATENT OFFICE 1,952,495

ENGINE

Robert F. Gatch, Columbus, Ohio

Substitute for application Serial No. 446,763, April 23, 1930. This application August 7, 1933, Serial No. 684,050

2 Claims. (Cl. 60—2)

This application is a substitute for S. N. 446,763, filed April 23, 1930.

This invention relates to a combined internal combustion engine and a steam engine and wherein means are provided for making use of a radiated heat generated by the combustion of the fuel during the operation of the engine to convert water into steam which is used to facilitate the operation of the piston or pistons on their power or working stroke.

It is a well known fact that the thermo-efficiency of an average gasoline engine is comparatively low and that a large percentage thereof is lost due to the escape of heat units in the exhaust gases and through the water jacket of the engine.

An object of the present invention is to make use of the heat units in the exhaust gases for raising the efficiency of the engine and to utilize this waste heat, which would otherwise be lost, for useful work.

It is also an object to provide a structure in the form of a boiler which is positioned and forms a part of the combustion chamber of the engine and through which boiler structure the ignited gases pass to give up part of their heat to produce steam for delivery to expansion chambers formed between the heads of the pistons and the closed ends of the cylinders where the expansion power of the steam is used to drive the pistons.

A further object of the invention lies in the provision of a boiler or heat exchanger in which water is heated to high temperatures by the ignition of the fuel passing through said boiler, the heat of the water within the boiler or exchanger serving to heat and evaporate the incoming fuel to form a highly combustible mixture.

A still further object of the invention is to provide an invention of this character which is extremely simple in construction, economical to manufacture and one which is comparatively light in weight and therefore applicable for use in airplanes or other air vehicles.

A still further object resides in the provision of a novel water level regulator which is thermostatically controlled and serves to keep the water level at a certain predetermined level within the boiler.

With these and other objects in view, which will appear as the description proceeds, the invention consists in the novel features of construction, combinations of elements and arrangements of parts hereinafter to be more fully described and pointed out in the appended claims.

Figure 2:
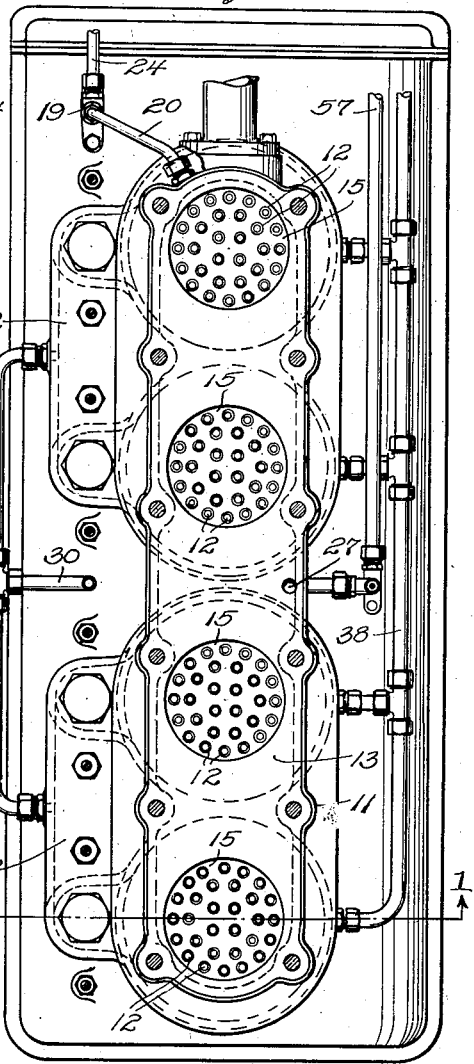

In the accompanying drawings:

Fig. 1 is a vertical transverse sectional view taken on the line 1—1 of Figure 2, Fig. 2 is a horizontal sectional view taken on the line 2—2 of Figure 1, Fig. 3 is a view in side elevation partly broken and showing more in detail the relation between the engine and its associated condenser, Fig. 4 is a partial plan view of the head of the motor showing the steam header, Fig. 5 is a vertical sectional view taken through the water regulator used in connection with the steam system of the engine, Fig. 6 is a similar view taken through the lower end of the regulator at right angles to that disclosed in Figure 5, Fig. 7 is a horizontal sectional view taken on the line 7—7 of Figure 5, Fig. 8 is a vertical sectional view taken through the pump used in connection with the apparatus.

Referring more particularly to the drawings the numeral 1 designates my improved engine in its entirety, and which engine includes two sets of vertically aligned cylinders 2 and 3, the latter being in open communication with the crank case 4 and in which is located the usual crank and cam shafts 5 and 6 respectively. The upper set 2 of the cylinders which in this instance is cast or formed integral with the lower set 3 is formed smaller in diameter than the latter and is used for the expansion of combustible gases, whereas the lower set 3 is employed for the expansion of steam. Reciprocating within these cylinders are pistons 7 which are reduced at their upper ends so as to fit the side walls of the upper cylinders and to produce working faces 8 and 9 which cooperate with the inner ends of the cylinders to form expansion chambers for the gas and the steam in their respective cylinders.

Positioned between the upper ends of the cylinders 2 and the cylinder head 10 of the engine is a boiler structure 11 which extends a considerable height above the cylinders and is provided with a plurality of tubes 12 passing therethrough and connecting the upper and lower walls 13 and 14. The tubes 12 are in open communication with the cylinders 2 and terminate at their upper ends into chambers 15 formed at the upper end of the boiler structure 11. This boiler structure may be bolted or otherwise secured to the cylinders of the engine and the head 10 and the joints formed between the ends thereof sealed by means of gaskets 16 so as to form a fluid tight connection between the ends of the boiler, the cylinders and the cylinder head. The cylinder head 10 may be of the usual construction and is provided with the customary inlet and exhaust ports for the fuel gases, and the valve mechanism 17 for governing the admission and emission of said gases. The valve mechanism 17 is operated in the usual manner from the cam shaft of the engine.

Associated with the boiler structure 11 is a reservoir 18 for holding liquids such as water which is conveyed to the boiler structure by means of a pump unit 19 and the line 20. The pump includes a casing 21 which is bolted or otherwise secured by fastening elements 22 to the frame structure of the engine. Mounted for reciprocation within this casing is a pump rod 23 which has its lower end formed with an enlarged head 24 engaging a cam 25 provided upon the cam shaft 6. It will be understood, of course, that this pump may be operated by any suitable mechanism other than the cam shaft. It will be seen that due to the location of the pump with respect to the reservoir that the liquid will gravitate through the branch 24 of the pipe line 20 into the pump casing through the port 25 formed in the side wall of the casing 21. Thus, upon the upward movement of the pump rod 23 the water entrapped above the rod will be forced upwardly through the line 20 and into the boiler structure. The line 20 and 24 may be also equipped with oppositely operating check valves which will prevent the return of the water and insures the movement of the liquid in one direction. A spring 26 may be interposed between the lower end of the pump rod 23 and the engine frame and which spring serves to hold the head of the pump rod in operative contact with the cam 25.

The boiler structure 11 which consists of a hollow casing and connects all of the cylinders 2 of the engine is provided with a port 27 located in its top wall 13 and with which port is aligned and connected the lower end of a tube or conduit section 28 leading to a steam dome or header 29 positioned above the boiler and cylinder head 10. Leading from the steam header 29 is a conduit 30 which has its lower end connected with a horizontally extending manifold 31 leading to steam chests 32, each of which connects a pair of the cylinders 3. Operating to open and close a port 33 leading into the upper end of the cylinder 3 and communicating with the steam chest 32 is a valve 34 which is governed in its operation by a double faced cam 35 fixed to the cam shaft 6.

The engine is shown to be of the four cycle type and comprises the cylinders 2 and the valve mechanism which is adapted to admit in the usual manner the explosive fuel through the proper ports and which is ignited at the proper time by the spark plugs 36, the spent gases being subsequently expelled from the engine. The hot gases within the chambers 15 and the tubes or flues 12 will, upon the working stroke of the pistons 7, be forced downwardly into the cylinders 2 and due to the gases contacting with the side walls of the flues will quickly raise the temperature of the water so that steam will be generated and collected within the dome or header 29 from where it is conducted by way of the conduit 30 and manifold 31 into the steam chests of the cylinders 3. The valve 34 is so timed that when the piston 7 starts down on its working stroke the valve 34 will be opened and steam will be admitted back of the piston and against the face 8 so as to facilitate the power or working stroke thereof. As the piston 7 reaches the limit of its stroke it will uncover a port 37. The uncovering of the port 37 takes place after the closing of the port 33. The steam under pressure is thus exhausted through the exhaust line 38 which leads to the top of the condenser or radiator 39 wherein the steam will condense by the aid of the fan 40 and is collected within the reservoir 18 thus forming a closed water circulating system. It will be noted that due to the double faced cam 35 and the gearing between the crank and cam shaft, the valve 34 will be opened to admit steam into the cylinder 3 at each revolution of the shaft or downward stroke of the piston. Thus, there will be a continuous flow of power developed by the engine. As stated before, the engine proper which is of the four cycle type, will upon its exhaust stroke force the exhaust gases back through the flues or tubes 12 and the gas will again give off additional heat by contact with the tubes before passing out and into the atmosphere. By this arrangement sufficient steam will be developed to maintain a constant pressure within the system. To prevent a radiation of the heat through the outer walls of the boiler 11 and the cylinders 3 the same may be covered with an insulating material 41. The cylinders 2 are provided with fins 42 between which the air can pass in order to keep the internal combustion engine cool and at proper working temperatures. Due to the elimination of the water jacket considerable weight is eliminated making the engine very light and thus adapting the same for use in air service or other places where an engine of light weight is desirable.

To maintain the liquid level at a proper height within the boiler there is employed a regulator which is in communication with the lower part of the boiler structure 11 and the steam header 29. The regulator consists of a tubular casing 43 formed at its upper end with an enlarged head 44 which is hollow and in open communication with the casing 43 and the steam dome 29 by means of the connection 45. The lower end of the casing 43 is also in open communication with the interior water receiving space of the boiler 11 through the connection of the pipe section 46. Thus, the water will rise within the regulator casing to a height equal to that of the boiler. Positioned within the casing 43 is a longitudinally extending shaft 47 which has its ends formed with cone shaped points 48 positioned within bearing caps 49 threadedly received within the upper and lower end of the regulator. The shaft is thus free to oscillate or rotate without undue friction. The bearing caps 49 are adjustably positioned and may be regulated to take up any wear or slack which may develop between the ends of the shaft 27 and the conical seats provided within said caps. The lower end of the casing 43 is formed with a reduced bore 50 for the reception of the enlarged portion 51 formed with the lower end of the shaft 47. This enlargement serves as a valve and has a transverse bore 52 formed therein which is adapted to register with a passage 53 forming a part of a by-pass, the purpose of which will appear later. Positioned within the hollow head 44 is a thermostatic coil 54 which is formed of two flat ribbons or metals having different coefficient of expansion. This coil has its inner or centrally located end 55 rigidly secured to the shaft 47 and its other end 56 anchored in the side walls of the head 44. This thermostatic element or coil 54 serves when heated or cooled to rotate the shaft so as to control the port 52 in and out of registration with the passage 53.

The arrangement of the coil 54 and the port 52 is such that when the head 44 is filled with steam the port 52 will then be out of registration with the passage 53 but when the water raises to the point covering the coil and due to the difference in temperature between the water which is less than that of the steam, the coil will contract rotating the shaft 47 and the valve member 51 thus aligning the port 52 with the passage 53 permitting the water to drain through said port by way of the by-pass and into the line 57 which leads to the upper portion of the reservoir 18. It will be obvious that as the water recedes below the thermostatic coil the same will again expand due to the heat of the steam and shut the passage 53 by means of the enlargement 51.

Due to the location of the pipe connection 46 at the lower end of the regulator the water will upon shutting down the engine and upon the opening of the by-pass and the cooling of the thermostat, gravitate back into the reservoir 18 or to a level equal to that in said reservoir and condenser. This emptying of the boiler will prevent damage to the boiler and its tubes due to freezing when the engine is standing idle in the cold seasons of the year. The pump unit 19 which is continuously operated will upon the starting of the engine fill the boiler with water very quickly, and thus the steam will be instantly produced with the first revolution of the engine.

To prevent the water from entering the steam line 30, there is provided within the steam dome or header 29 a cylindrical member 58 which is closed at its ends and provided with a plurality of perforations 59 located near the upper wall of the header. The perforations 59 due to their location will admit steam to the member 58 but will prevent water from entering the steam line due to vibrations and slight rocking movements of the motor.

From the foregoing description taken in connection with the accompanying drawings, it will be seen that in the operation of the engine the combustion of the fuel takes place in the combustion chamber located above the boiler structure and that the ignited gases pass downwardly through the tubes or flues in a plurality of streams or flames into the combustion cylinders and due to the expansion of the gas move the pistons downwardly on their power or working strokes. Simultaneously with this operation a large portion of the heat contained in the gases will pass through the tube walls raising the temperature of the water in the boiler to a high degree forming steam which is also utilized to act upon the piston thus adding more power thereto on their combustion strokes and also aiding the same on their fuel intake strokes. On the exhaust strokes of the pistons the spent gases are again passed through the tubes to further give off heat before finally being expelled from the engine. The heated gases are thus used twice in their action of raising the temperature of the water for forming steam. Due to the heat of the water and the heated tube walls the incoming fresh fuel charge will upon the return stroke of the piston become heated, vaporized and thoroughly intermingled to form a highly combustible mixture which will be easily fired thus making use of all the fuel within the cylinder resulting in a more economical operation of the engine.

As the water within the boiler is kept automatically at a certain level, and the boiler pressure is in ratio with the speed of the internal combustion end of the engine no attention thereto is needed by the operator of the engine. The pistons in the engine which are formed with two working faces, against which the expansible gases contact, provide for a larger working area making it possible for the engine to deliver considerable overload power with the added advantage of possessing a higher degree of flexibility than the ordinary type of internal combustion engine.

What is claimed is:

1. In an internal combustion engine the combination with the cylinders and the head therefor, of a boiler interposed between said cylinders and head and provided with a plurality of vertically arranged flues extending therethrough and in open communication with the interior of said cylinders, there being a body of liquid within said boiler, fuel inlet and exhaust ports in said head whereby upon the operation of the engine the ignited gases will first pass through the flues in a downward direction upon the working stroke of the piston and again pass through said flues upon the exhaust stroke of said engine before finally being expelled through said exhaust port.

2. In an internal combustion engine the combination with the cylinders and the head therefor, of a boiler structure containing liquid interposed between said cylinders and head and provided with a plurality of vertically arranged flues in open communication with the interior of said cylinders, the upper wall of said boiler being spaced from said cylinder head to form a combustion chamber therebetween, means for admitting fuel into said combustion chamber which upon being ignited will expand and pass downwardly through said flues and into the cylinders of said engine, whereby the heat transmitted to the tubes by the passage of gases therethrough will raise the temperature of the liquid within said boiler structure.

ROBERT F. GATCH.